United States Patent

[11] 3,579,004

[72] Inventors Alan E. Patrick
Statesville;
Kenneth E. Kern, Charlotte, N.C.
[21] Appl. No. 866,970
[22] Filed Oct. 16, 1969
[45] Patented May 18, 1971
[73] Assignee General Time Corporation
Stamford, Conn.

[54] SYNCHRONOUS MOTOR FOR CLOCKS AND THE LIKE
8 Claims, 9 Drawing Figs.

[52] U.S. Cl. ..................................................... 310/164
[51] Int. Cl. .................................................. H02k 21/00
[50] Field of Search ........................................... 310/164, 162.3

[56] References Cited
UNITED STATES PATENTS
2,412,461 12/1946 MacIntyre .................... 310/164
2,804,557 8/1957 Roters .......................... 310/164

*Primary Examiner*—D. X. Sliney
*Attorney*—Pennie, Edmonds, Morton, Taylor & Adams ABSTRACT: A synchronous AC motor for driving clocks or the like having pole structure for producing shaded and unshaded flux in an annular airgap, the airgap being occupied by a rotor having adjacent loops of material of unlike magnetic retentivity, one loop having sufficiently low coercive magnetic intensity to serve, by induction, to start the rotor and bring it up to speed and the second loop having a sufficiently high coercive magnetic intensity as to form durable spots of permanent magnetism for providing torque at synchronous rotor speed. A thick shading ring, to achieve a high shading current, is accommodated by a special pole configuration to achieve compact spacing between the shaded and unshaded poles. The first ring is positioned to be subject to the major flux under starting conditions.

Patented May 18, 1971
3,579,004
2 Sheets-Sheet 1
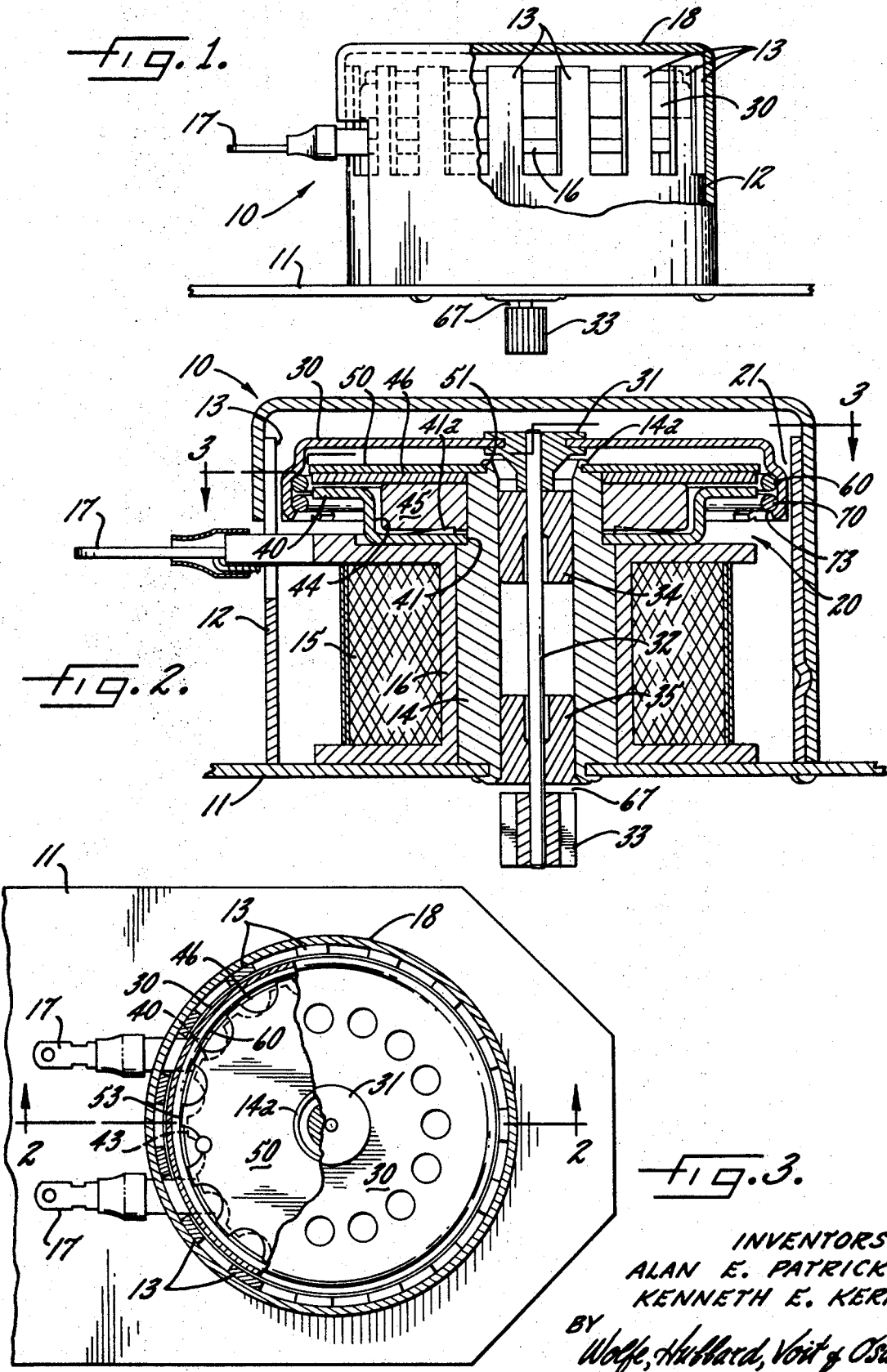
INVENTORS.
ALAN E. PATRICK
KENNETH E. KERN
BY Wolfe, Hubbard, Voit & Osann
ATTORNEYS.

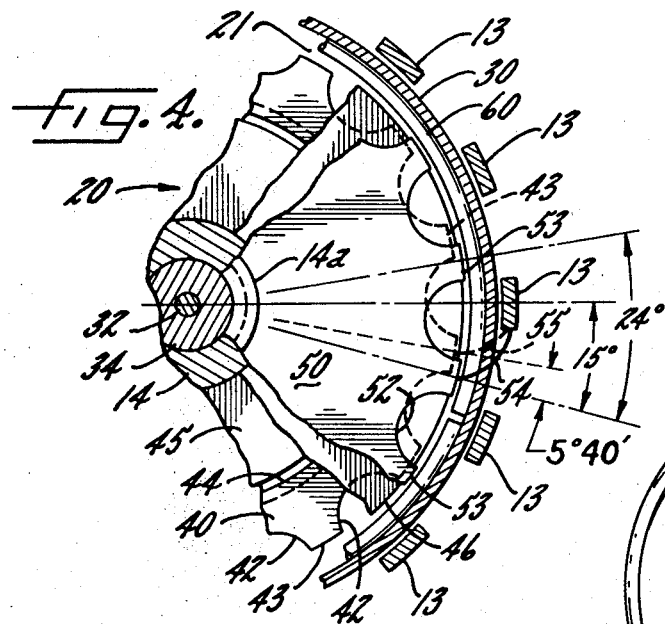
fig. 4.
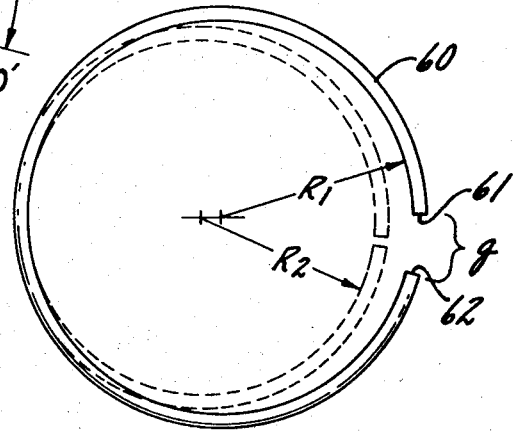
fig. 5.
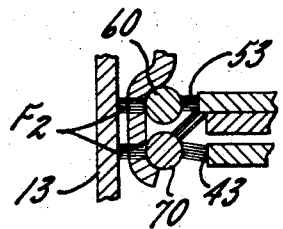
fig. 7a.
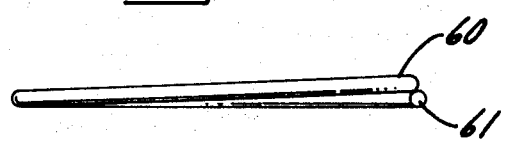
fig. 6.
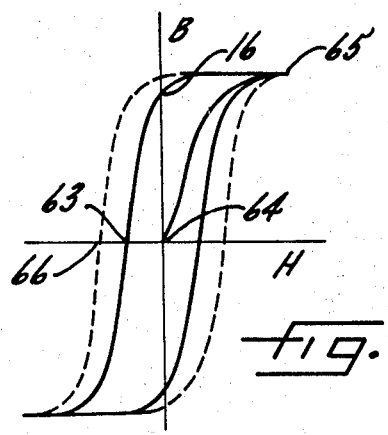
fig. 7b.
fig. 8.
INVENTORS.
ALAN E. PATRICK
KENNETH E. KERN
BY Wolfe, Hubbard, Voit & Osann
ATTORNEYS.

SYNCHRONOUS MOTOR FOR CLOCKS AND THE LIKE

It is an object of the invention to provide a synchronous AC motor for a clock or the like which is simple and inexpensive but which has improved starting and running torque compared to motors of comparable size.

Other objects and advantages of the invention will become apparent upon reading the attached detailed description and upon reference to the drawings in which:

FIG. 1 is a side view of the motor constructed in accordance with the present invention partly in section;

FIG. 2 is a vertical section looking along the line 2-2 in FIG. 3;

FIG. 3 is a broken horizontal section taken along the line 3-3 in FIG. 2;

FIG. 4 is an enlarged fragmentary view showing the pole profile;

FIGS. 5 and 6 are face and edge views respectively of a magnetic loop employed in the present invention;

FIGS. 7a and 7b are enlarged fragments showing the loops in relation to the poles under starting and running conditions; and FIG. 8 shows the hysterisis characteristics of the two rotor loops.

Turning now to the drawings and particularly to FIG. 2 there is shown a motor 10 having a front plate 11 of magnetic material upon which is mounted a cylindrical stator pole member 12 of magnetic material, its rim being formed into a series of peripheral pole pieces 13. The cylindrical pole member 12 and plate 11 taken together, form a magnetic cup. Secured to the plate 11 centrally within the cup is a hollow post 14 of magnetic material. Telescoped over the post and received in the cup is a coil 15 which is would on a bobbin 16, mounting terminals 17. Enclosing the pole pieces 13 is a cover 18 nonmagnetic material such as aluminum.

Mounted at the end of the post 14 is a pole structure indicated generally at 20 which, together with the pole pieces 13, defines an annular air gap 21. Centered within the airgap is the rim of a rotor 30, which is of shallow cup shape, mounted upon a hub 31 secured to a shaft 32 and carrying a pinion 33 at its outer end. For the purpose of mounting the shaft, spaced bearings 34, 35 are provided which are preferably of the lubricant filled, sintered type pressed into the central opening in the post 14.

In accordance with the present invention, a pair of magnetic discs are secured to the end of the post having a shading ring interposed between them, the discs being notched to form a circular array of shaded and unshaded poles, the rotor having a relatively "soft" ring and a relatively "hard" ring of magnetic material having different coercive magnetic intensity arranged side-by-side in the airgap to provide starting and running torque. Further in accordance with the invention, a composite shading ring is employed, made up of a thick ring of limited radius and a thinner ring having a radius which extends substantially out to the periphery of the poles, and with one of the magnetic discs being dished to accommodate the thick shading ring thereby permitting the shaded and unshaded poles to be spaced closely adjacent one another at the airgap.

Thus as shown in FIGS. 2 and 4, an unshaded pole member is provided in the form of a disc 40 of magnetic material having a central opening 41 and a series of evenly spaced notches at 42 to define unshaded poles 43. A total of 15 poles is employed for a rated speed of 240 r.p.m. At its center the pole member 40 is dished, or stepped, to form a cross section which includes an axial portion 44 to accommodate a relatively thick shading ring 45. Adjacent the ring 45 is a second shading ring member 46 which is axially quite thin and which extends out to the periphery of the poles. The two ring members 45, 46 cooperate to act as a composite shading ring of large current carrying capacity for the purpose of shading, or offsetting in the lagging direction, the phasing of the flux in the upper pole member. "Inside" shading, with the rings on the central pole, is more efficient than the "outside" shading often used in clock motors.

The upper or shaded pole 50, also of disc shape, has a central opening 51 and is similarly formed with notches 52 about the periphery to define a plurality of shaded poles 53. The shaded poles 53 and the unshaded poles 43 are preferably offset from one another by an angle of 5° 40', with the two cooperating poles being more or less centered with respect to the space between the peripheral pole pieces 13 (see FIG. 4). More specifically, the angle between the center of one of the poles 53 and the centerline of the adjacent pole piece 13 is preferably on the order of 15°. Because of the inevitable losses which occur due to the circulating currents in the shading ring, the shaded flux is not only shifted in phase but is reduced in magnitude and, to compensate for this, the shaded poles 53 are preferably radially extended to reduce their effective airgap with respect to the pole pieces 13.

The net effect is to produce a shaded flux 54 and an unshaded flux 55 coupled to the pole pieces 13 to produce a rotating field of flux within the airgap which goes through a complete cycle in one-fifteenth of the total periphery, their being a total of 15 poles, to produce a synchronous speed of 240 r.p.m.

For the purpose of retaining the central disc-shaped pole members, and the associated shading ring structure in a tightly held stack, the end of the post 14 is preferably spun over as indicated at 14a, with lost motion being taken up by tabs 41a integral with member 41 and which are struck from the body of the latter.

In carrying out the invention first and second magnetic loops of different coercive magnetic intensity are mounted upon the rotor, the first loop being sufficiently "soft" so that there are no permanent induced poles, so that the rotor is started and brought up to speed by induction, whereas the second loop has a sufficiently high coercive magnetic intensity that permanent poles are induced in it to provide a reliable level of synchronous torque during running conditions. Thus, taking the "soft" loop 60 by way of example (see FIG. 5), it consists of somewhat less than a complete convolution of magnetic wire having a nominal radius R1 and ends 61, 62 defining a gap $g$. In a practical case the wire may have a thickness of 0.043 inch and may be cut from a single-pitch helix or coil spring so that it has a helical configuration when viewed edgewise as shown in FIG. 6.

The wire may be of any suitable magnetic alloy, capable, through appropriate treatment, of achieving a coercive magnetic intensity of 250 oersted. The coercive magnetic intensity is the value of magnetic intensity (H), indicated at 63 in FIG. 8, which is required to restore the residual flux (B) back to zero after the material has been previously magnetized, to saturation, in one direction. Thus, taking a given sample of wire which is not magnetized, starting at the origin 64 of the B-H curve (see FIG. 8), application of magnetic intensity, created by current in a coil, in the positive direction causes the flux flowing in the sample to be gradually increased to a level 65 where saturation occurs, i.e., to a level where a further increase in magnetic intensity does not bring about any appreciable increase in the flux. Upon removing the source of magnetic intensity, a sample of retentive magnetic material will revert to the condition indicated at 66, indicating the level of residual magnetism. In order to reduce the residual magnetism to zero it is necessary to apply magnetic intensity in the reverse direction, for example by reversing the current, until a condition of zero residual flux is achieved in the sample. In the case of the material of which the loop 60 is composed, subjected to appropriate heat treatment, the magnetic intensity must reach a level of 140 oersted, indicated at 63, before the residual flux is completely removed. This condition is readily achievable using a commercial product sold under the name Koerflex 300 wire Article No. 33049002, Type 32. Heat treatment for the purpose of producing the desired coercive magnetic intensity in this or other magnetically retentive wire is within the skill of the art. Since many different catalog wires may be employed to meet a coercive magnetic intensity on the order of 140 oersted, it is unnecessary to spell out the precise alloy composition or conditions of heat treatment.

Arranged adjacent to the loop of wire 60 is a second loop of wire 70 of identical dimension and type but differently heat treated to obtain a coercive magnetic intensity of 250 oersted. The hysteresis characteristic of the loop 70 is indicated by the dotted line in FIG. 8, the higher oersted level, at 66, being apparent.

For the purpose of confining the two loops of wire side-by-side in the shell of the rotor 30, an annular recess is provided within the rotor having an axial width which is approximately twice the diameter of the loops to be confined and having a radius R2 which is somewhat less than the radius R1 so as to bring the ends of the loops into proximity with one another. Since the normal radius of the loop is greater than the final radius, the loop is, in effect, presprung tending to spring outwardly into a seated position within the recess 73. Because of the limited axial space available in the recess, each of the loops tends to depart from the helical condition shown in FIG. 6 to a planar condition in which the ends 61, 62 are directly opposite each other. The result is permanent, tight installation of the loops in a precise concentric position which is retained for the life of the device.

It is one of the features of the present invention that the "soft" loop 60 is so located with respect to the presented poles 43, 53 that it occupies a position of maximum flux density during starting, with sufficient play being provided in the rotor shaft so as to apply more balanced flux to the rotor loops under running conditions. Thus as shown in FIGS. 2 and 7a, with lost motion 67 adjacent the pinion 33, loop 60 may initially occupy a more favored position with respect to the poles 43, 53 so as to be subjected to the major flux indicated at F1. Any concentration of flux in the loop 60 tends to further insure the development of a high starting torque to get the rotor in motion. As the rotor begins to move, the rotor tends to adjust itself so as to minimize the total reluctance in the airgap, causing the rotor to take up the lost motion indicated at 67 and to move the loops axially so that they occupy a more symmetrical position with respect to the presented poles as shown in FIG. 7b. This assures adequate flux density in the region of the loop 70 of higher coercive magnetic intensity and tends to insure a reliably high level of synchronous running torque. In order to enhance this mode of operation, a light spring may be provided for bearing endwise upon the rotor shaft to urge the rotor normally into the position shown in FIGS. 2 and 7a.

Note, however, that the operation of the motor is not dependent upon the axial shift of the rotor between the starting and running conditions, but it has been discussed since it is one of the inherently and easily achievable advantages of the present invention.

While the operation of the rotor will be apparent from the above description, it may be helpful to summarize it briefly as follows: Energizing the coil 15 with alternating current at the usual commercial frequency of 60 Hertz causes the flux to be set up in separate paths. The first path is that which includes pole piece 13, cup 12, plate 11, post 14, and unshaded disc 49, terminating in poles 43. The second path includes the same cup, plate, and post, but the loop is completed through the shaded pole member 50 terminating in poles 53. Because of the heavy circulating current set up in the shading ring, the phase of the magnetism at the shaded poles 53 lags the phase of the magnetism at the unshaded poles 43 to produce a rotating field which, as between the adjacent poles, rotates through a complete cycle in one-sixtieth of a second. Because of the use of 15 poles, the time required for a complete revolution is fifteen times greater, in other words, one-quarter second, corresponding to a speed of 240 r.p.m. Rotation of the field at 240 r.p.m. includes magnetism and eddy currents in the soft loop 60 which act to overcome breakaway torque and to drag the rotor, and its connected load, around with increasing speed until a condition of near synchronism is achieved. Permanent spots of magnetism induced in the loop 70 then "take over" so that the rotor is locked in at synchronous speed. The loop 60 is sufficiently retentive as to contribute to the torque under conditions of synchronism.

Because of the slow speed and the reliable torque level at the rotor, fewer stages of step down gearing are required, thereby enabling simplification of the drive train when the motor is used in a clock or other timing device.

We claim:

1. A synchronous AC motor for driving a clock or the like comprising, in combination, an annular coil, a magnetic pole structure including a cup and a central post receiving the coil and extending axially beyond it, a pair of magnetic discs secured to the end of the post and defining an airgap with respect to the rim portion of the cup, a shading ring in the form of a disc of conducting material interposed between the magnetic discs, the rim of the cup being notched to form a circular array of parallel pole pieces, the magnetic discs being notched at the edge to form corresponding rings of shaded and unshaded poles respectively offset from one another, a rotor having a rim interposed in the annular gap between the poles and pole pieces, the rim having two loops of retentive magnetic material of substantially different coercive magnetic intensity arranged side-by-side thereon to provide starting and running torque.

2. The combination as claimed in claim 1, the rotor being in the shape of a shallow cup of nonmagnetic material having a peripheral rim formed with a shallow internal annular recess and with the loops being discontinuous and presprung for expansion outwardly into side-by-side seated position in the recess.

3. The combination as claimed in claim 1 in which one of the loops is formed of magnetic material heat treated to have a coercive magnetic intensity of approximately 250 oersted with the other of said loops being heat treated to have a coercive magnetic intensity for approximately 140 oersted.

4. The combination as claimed in claim 2 in which each of the loops is in the shape of a shallow helix of less than a complete turn and in which the internal recess in the rotor has an axial length of approximately double the diameter of the loop material so that upon insertion of the loops into the rotor the ends become contiguous and the loops are deformed into final planar configuration.

5. The combination as claimed in claim 1 in which at least one of the magnetic discs is of stepped cross section centrally dished to provide substantial spacing between the discs in the region of the axis, the shading ring being formed to occupy substantially all of the space between the discs extending to the vicinity of the periphery thereof.

6. The combination as claimed in claim 1 in which the shading ring is of composite construction, having an axially thin portion which extends substantially out to the airgap and a separate axially thick portion which extends only a portion of the way to the airgap, the innermost one of the magnetic discs being dished to accommodate the thick portion of the ring.

7. The combination as claimed in claim 1 in which the rotor has sufficient end play so that the soft ring may occupy the position of maximum flux during starting and so that the two rings share the position of maximum flux during synchronous running conditions.

8. A synchronous AC motor for driving a clock or the like comprising, in combination, an annular coil, a magnetic pole structure receiving the coil including a cup and central post, the cup having a series of pole pieces formed about the edge thereof and the post having a cooperating pole member presenting a series of poles and defining with the pole pieces an annular airgap in which the flux is concentrated within a short axial distance, means including a shading ring for shading a portion of the flux thereby to provide a rotating field in the airgap, a rotor having a shaft journaled in the post and having a shallow cup-shaped body of thin nonmagnetic material including a narrow rim mounted for rotation in the airgap, the rim having a shallow internal annular recess, a pair of loops mounted side-by-side in the recess, said loops being discontinuous and presprung for expansion outwardly into side-by-side seated position in the recess, said loops being formed of retentive magnetic material of substantially different coercive magnetic intensity, the coercive magnetic intensity of one of the loops being sufficiently low so as to provide torque for breakaway and acceleration under the influence of the field flux and the coercive magnetic intensity of the second loop being sufficiently high as to create induced durable spots of permanent magnetism to provide torque when the rotor comes up to a speed approaching synchronism for locking in of the rotor to the synchronous field.